US012774689B2

(12) United States Patent
Uchida

(10) Patent No.: US 12,774,689 B2
(45) Date of Patent: Oct. 27, 2026

(54) VEHICLE CONTROL SYSTEM AND VEHICLE

(71) Applicant: TOYOTA JIDOSHA KABUSHIKI KAISHA, Toyota (JP)

(72) Inventor: Akito Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 19/007,857

(22) Filed: Jan. 2, 2025

(65) Prior Publication Data

US 2025/0264069 A1 Aug. 21, 2025

(30) Foreign Application Priority Data

Feb. 20, 2024 (JP) ................................ 2024-023863

(51) Int. Cl.
*F02D 41/04* (2006.01)

(52) U.S. Cl.
CPC .................................... *F02D 41/04* (2013.01)

(58) Field of Classification Search
CPC ................. F02D 41/04; F02D 41/2422; F02D 2200/101; F02D 2250/26; F02D 29/02; G05D 17/02; G06F 8/65; G06F 8/71
See application file for complete search history.

(56) References Cited

U.S. PATENT DOCUMENTS 12,067,391 B2 * 8/2024 Okamoto .................. G06F 8/65
2008/0072878 A1 * 3/2008 Kokubu ................ F02D 19/088 123/304
2020/0409678 A1 * 12/2020 Ju ............................ G06F 8/65
2021/0132937 A1 5/2021 Ishikawa et al.
2022/0205404 A1 * 6/2022 Williams ............ F02D 41/2477

FOREIGN PATENT DOCUMENTS

CA 2513032 C * 11/2010 ......... F02D 41/2422
DE 102019212798 A1 * 3/2021 ........... F02D 41/021
JP 2022-033188 A 2/2022

* cited by examiner

*Primary Examiner* — George C Jin
(74) *Attorney, Agent, or Firm* — Oliff PLC

(57) ABSTRACT

A vehicle control system includes a portable terminal in which application software associated with a vehicle equipped with an engine is installed, and an on-vehicle control device is configured to store a plurality of torque upper limit maps each defining an upper limit of torque of the engine for each version of the application software, and to communicate with the portable terminal. The on-vehicle control device is configured to change a first torque upper limit map among the plurality of torque upper limit maps to a second torque upper limit map among the plurality of torque upper limit maps, on a basis of an update of the version of the application software installed in the portable terminal, and to use the second torque upper limit map for controlling the vehicle.

4 Claims, 4 Drawing Sheets

VEHICLE CONTROL SYSTEM AND VEHICLE

CROSS-REFERENCE TO RELATED APPLICATION

This application is based upon and claims the benefit of priority of the prior Japanese Patent Application No. 2024-023863, filed on Feb. 20, 2024, the entire contents of which are incorporated herein by reference.

TECHNICAL FIELD

The present disclosure relates to a vehicle control system and a vehicle.

BACKGROUND

A control device called an electronic control unit (ECU) is mounted on a vehicle. The control device includes a control unit such as a central processing unit (CPU). The control device includes a storage unit that stores one or more programs. The control unit executes one or more programs stored in the storage unit to achieve a function of the control device. In order to improve the function of the control device, it has been proposed to rewrite and update the program stored in the storage unit to a newer version.

For example, a method of updating a program (hereinafter, referred to as software) for executing control of a vehicle, such as an engine control program, has been proposed. In this updating method, when the download of the installation package of the new version of the software is completed, a notification that the software update process is executed is sent to an information terminal of a user of the vehicle. Thereafter, the update process is started at least when the information terminal receives a predetermined operation by the user, such as an operation of accepting the start of the update process, and when the vehicle is locked (see, for example, Japanese Unexamined Patent Application Publication No. 2022-033188).

As described above, before the software for executing the control of the vehicle is actually updated, the preprocess, such as the download of the installation package and the notification to the information terminal that the software update process is executed, is needed. However, when such preprocess is needed, it is difficult to smoothly update the software. For example, when the upper limit of the torque of the engine is changed by updating software, if the above-described preprocess occurs every time the upper limit of the torque is changed, it might take time until the software is actually updated.

SUMMARY

It is therefore an object of the present disclosure to provide a vehicle control system and a vehicle that change an upper limit of engine torque without updating software controlling the vehicle.

The above object is achieved by a vehicle control system including: a portable terminal in which application software associated with a vehicle equipped with an engine is installed; and an on-vehicle control device is configured to store a plurality of torque upper limit maps each defining an upper limit of torque of the engine for each version of the application software, and to communicate with the portable terminal, wherein the on-vehicle control device is configured to change a first torque upper limit map among the plurality of torque upper limit maps to a second torque upper limit map among the plurality of torque upper limit maps, on a basis of an update of the version of the application software installed in the portable terminal, and to use the second torque upper limit map for controlling the vehicle.

The on-vehicle control device may be configured to change the first torque upper limit map to the second torque upper limit map every time the version is updated.

The on-vehicle control device may be configured to change the first torque upper limit map to the second torque upper limit map, when a shift to a circuit mode in which driving performance of the vehicle is improved in a circuit is requested from the portable terminal while the vehicle is stopped.

Also, the above object is achieved by a vehicle including: an engine; a storage device configured to store a plurality of torque upper limit maps each defining an upper limit of torque of the engine for each version of application software installed in a portable terminal and associated with a vehicle equipped with the engine; and a control device configured to communicate with the portable terminal, to change a first torque upper limit map among the plurality of torque upper limit maps to a second torque upper limit map among the plurality of torque upper limit maps on a basis of an update of the version of the application software installed in the portable terminal, and to use the second torque upper limit map for controlling the vehicle.

DETAILED DESCRIPTION

Hereinafter, embodiments of the present disclosure will be described with reference to the drawings.

Figure 1:
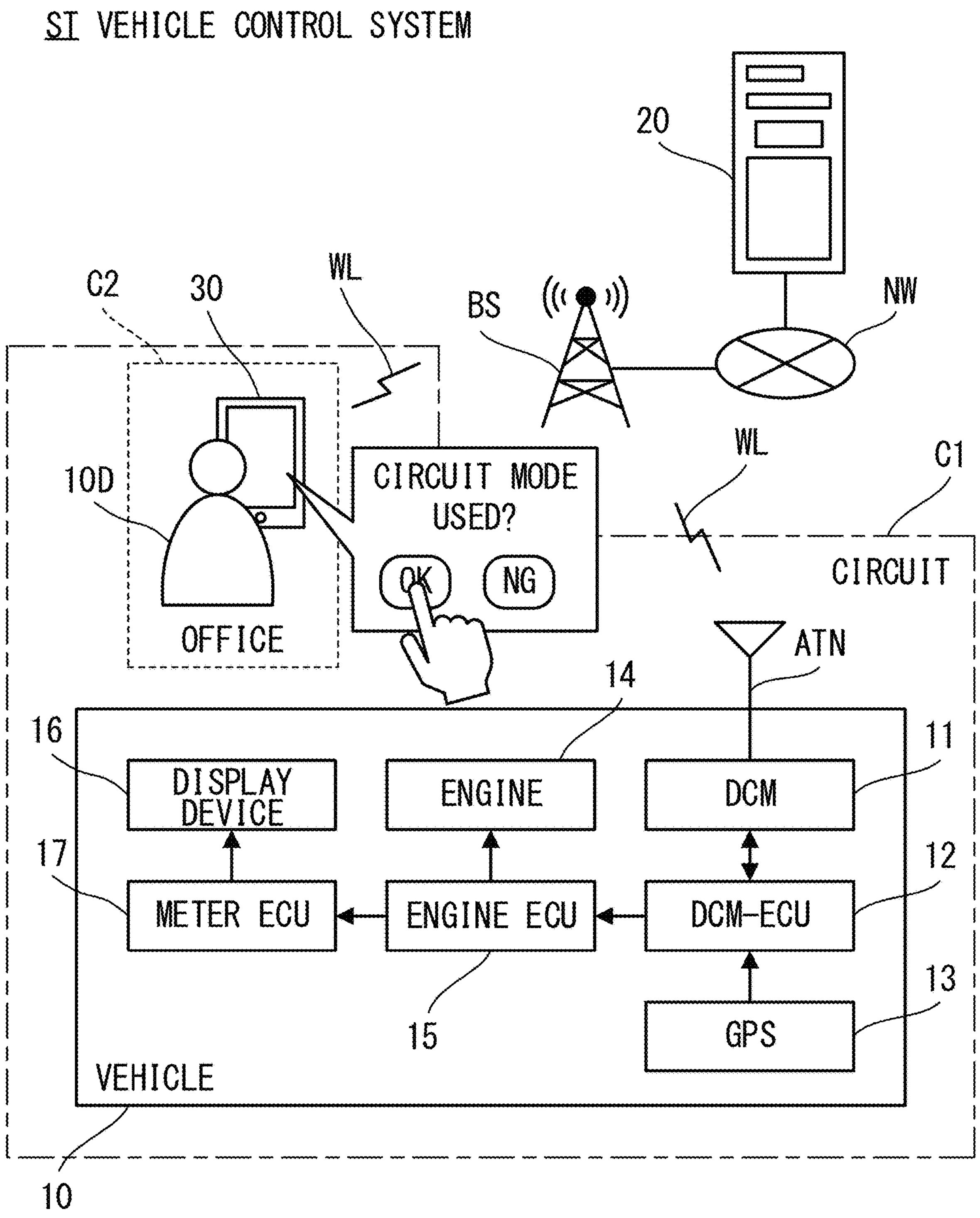
FIG. 1 is a view illustrating an example of a vehicle control system.

As illustrated in FIG. 1, a vehicle control system ST includes a vehicle 10, a server 20, and a portable terminal 30. Although a smartphone is illustrated as an example of the portable terminal 30 in FIG. 1, a tablet terminal may be used instead of the smartphone. The vehicle 10, the server 20, and the portable terminal 30 cooperate with one another, whereby the vehicle control system TS provides a driver 10D of the vehicle 10 with a service specific to the circuit station C1.

For example, when the vehicle 10 enters a circuit C1 and the driver 10D operates the portable terminal 30 in an office C2 of the circuit C1 to activate a circuit application, the portable terminal 30 acquires GPS information including a current position of the vehicle 10 via the server 20. The circuit application is application software installed in the portable terminal 30 and is associated with the vehicle 10. The circuit application is used when the vehicle 10 is controlled in a circuit mode.

The vehicle 10 includes a data communication module (DCM) 11 as a wireless communication device to which an antenna ATN is connected, a DCM-ECU 12, and a global positioning system (GPS) 13. The GPS 13 measures the position of the vehicle 10 and holds GPS information including the measured position. The DCM-ECU 12 acquires GPS information from the GPS 13 and transmits the GPS information to the server 20 by radio wave WL via the DCM 11 and the antenna ATN. Therefore, when the server 20 requests the vehicle 10 to transmit the GPS information, the server 20 acquires the GPS information from the vehicle 10. The GPS information reaches the server 20 via a base station BS and a communication network NW. The communication network NW includes one or both of the Internet and a local area network (LAN). When the portable terminal 30 requests the server 20 to transmit the GPS information, the server 20 transmits the GPS information to the portable terminal 30 by the radio wave WL via the communication network NW and the base station BS. Thus, the portable terminal 30 acquires the GPS information of the vehicle 10.

The server 20 also holds map information (hereinafter referred to as circuit information) including the position or area of the circuit C1. When the portable terminal 30 requests the server 20 to transmit the circuit information, the server 20 transmits the circuit information to the portable terminal 30 by the radio wave WL via the communication network NW and the base station BS. Thus, the portable terminal 30 acquires the circuit information.

When the portable terminal 30 acquires the GPS information and the circuit information, the portable terminal 30 determines whether or not the current position of the vehicle 10 is within the circuit C1 on the basis of the circuit information and the GPS information. When the vehicle 10 is not in the circuit C1, the portable terminal 30 rejects a shift to the circuit mode and presents the fact to the driver 10D on the screen.

On the other hand, when the vehicle 10 is located in the circuit C1, the portable terminal 30 presents a notice of the shift to the circuit mode to the driver 10D and requests the driver 10D to accept the shift. In this way, in the circuit mode, it is determined whether or not the position of the vehicle 10 is within the circuit 1 on the basis of the circuit information and the GPS information. Therefore, the circuit mode is different from a sport mode (or a sport driving mode) in which the driving performance is improved only by switching of a switch provided in the vehicle cabin of the vehicle 10 without executing such determination.

When the portable terminal 30 receives the approval of the shift from the driver 10D, the portable terminal 30 transmits circuit-mode request information (hereinafter, referred to as request ID (Identifier)), including the approval of the shift, to the server 20. The request IDs are identification information for requesting the vehicle 10 to shift to the circuit mode. Each of the request IDs is prepared and defined for each version of the circuit application. Therefore, when the version of the circuit application is updated, different independent request ID is transmitted on the basis of the update of the version.

When the request ID is transmitted from the portable terminal 30 to the server 20, the server 20 generates switching information including the request ID and transmits the switching information to the vehicle 10. The switching information is information for switching the driving performance of the vehicle 10 to driving performance specialized for the circuit C1, which will be described in detail later. For example, the server 20 transmits the switching information to the vehicle 10 by a short message service (SMS).

In the vehicle 10, the DCM-ECU 12 receives the switching information from the server 20 via the DCM 11 and the antenna ATN. The vehicle 10 includes an engine 14, an engine ECU 15, a display device 16, and a meter ECU 17. The engine ECU 15 is an example of an on-vehicle control device. The display device 16 is provided in the vehicle cabin of the vehicle 10.

When the DCM-ECU 12 receives the switching information, the DCM-ECU 12 transmits the switching information to the engine ECU 15 by use of a controller area network (CAN) signal. When the engine ECU 15 receives the switching information, the engine ECU15 changes the control of the engine 14 based on the request ID included in the switching information. For example, the engine ECU 15 changes a torque upper limit map (hereinafter, simply referred to as torque map) that defines an upper limit of the torque of the engine 14. Thus, the engine 14 is operated in the circuit mode in which high torque is output. In this way, the driving performance of the vehicle 10 is improved in the circuit mode as compared with the normal driving mode.

When the engine ECU 15 changes the control of the engine 14, the engine ECU 15 transmits meter display control information to the meter ECU 17. The meter display control information is information for controlling display of a tachometer provided in the display device 16. For example, when the engine ECU 15 changes the torque map, the engine ECU 15 generates meter display control information and transmits the meter display control information to the meter ECU 17. The meter ECU 17 controls the display of the tachometer based on the meter display control information. When the circuit mode is selected, a boundary rotational speed between a first meter display region and a second meter display region on the high rotational speed side adjacent to the first meter display area is changed to the high rotational speed side. The first and second meter display regions indicate a rotational speed of the engine 14.

Thus, the meter display is shifted from the normal driving mode to the circuit mode. As a result, the driver 10D recognizes that the circuit mode is selected. In this way, the circuit mode is selected, whereby the service of conveying the enjoyment of the motor sports to the driver 10D is provided.

Next, the portable terminal 30 will be described in detail with reference to FIG. 2A.

Figure 2A:
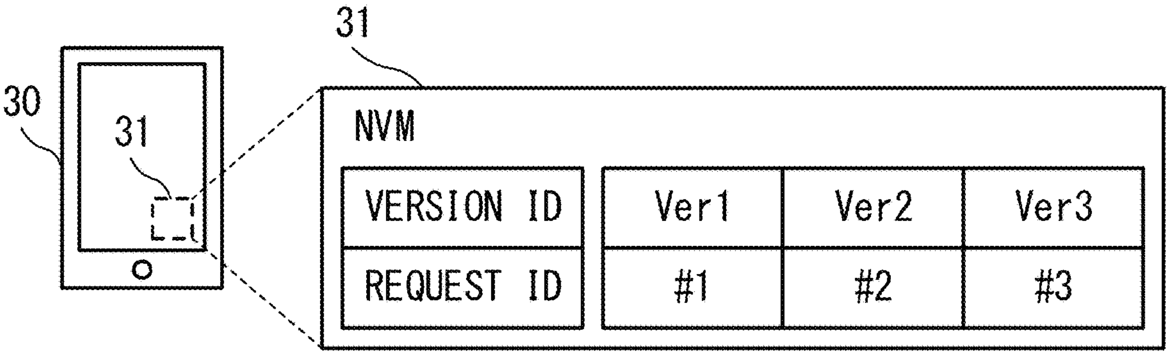
FIG. 2A is a view illustrating an example of a correspondence table held in a portable terminal.
Figure 2B:
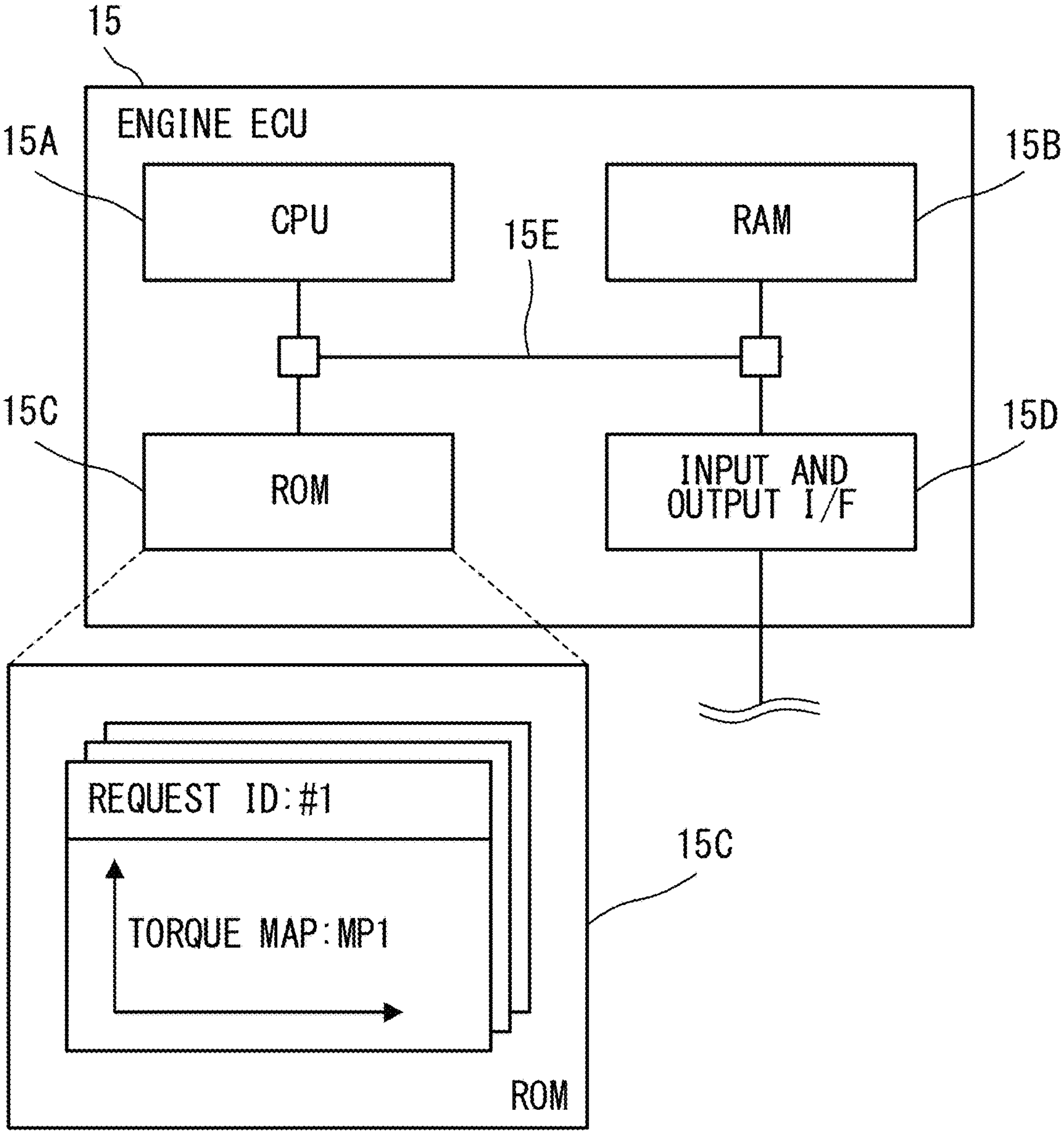
FIG. 2B is a view illustrating an example of a hardware configuration of an engine ECU.

As illustrated in FIG. 2A, the portable terminal 30 includes a non-volatile memory (NVM) 31. The NVM 31 stores a correspondence table of version IDs for identifying versions of the circuit application and the request IDs. For example, a request ID "#1" is associated with a version ID "Ver1". A request ID "#2" is associated with a version ID "Ver2". Thus, when the version of the circuit application is updated from, for example, the version ID "Ver1" to the version ID "Ver2", the portable terminal 30 transmits the request ID "#2".

Next, referring to FIGS. 2B and 3A to 3C, the engine ECU 15 will be described in detail. Hardware configurations of the DCM-ECU 12 and the meter ECU 17 are basically the same as the hardware configuration of the engine ECU 15, and thus detailed description thereof will be omitted. The engine ECU 15 indirectly communicates with the portable terminal 30 via the DCM-ECU 12, the server 20, or the like.

The engine ECU 15 is a hardware circuit including a CPU 15A, a random access memory (RAM) 15B, a read only memory (ROM) 15C, and an input and output interface (I/F) 15D. The CPU 15A is an example of a control device such as a processor, and indirectly communicates with the portable terminal 30. The ROM 15C is an example of a storage device. The CPU 15A, the RAM 15B, the ROM 15C, and the input and output I/F 15D are connected to one another via an internal bus 15E. Although omitted in FIG. 2B, the input and output I/F 15D is connected to the DCM-ECU 12, the engine 14, and the meter ECU 17. At least the CPU 15A and the RAM 15B cooperate with each other to achieve a computer.

In the RAM 15B mentioned above, the software pre-stored in the ROM 15C is stored by the CPU 15A. The CPU 15A executes the stored software, and then the CPU 15A executes a series of processes described later. The software may be in accordance with a processing sequence diagram described later.

The ROM 15C stores a plurality of torque maps for respective of the request IDs. Each of the torque maps defines an upper limit of the torque of the engine 14. The request IDs are prepared and defined for respective versions of the circuit application. This means that the plurality of torque maps is stored in the ROM 15C for respective versions of the circuit application.

Figure 3A:
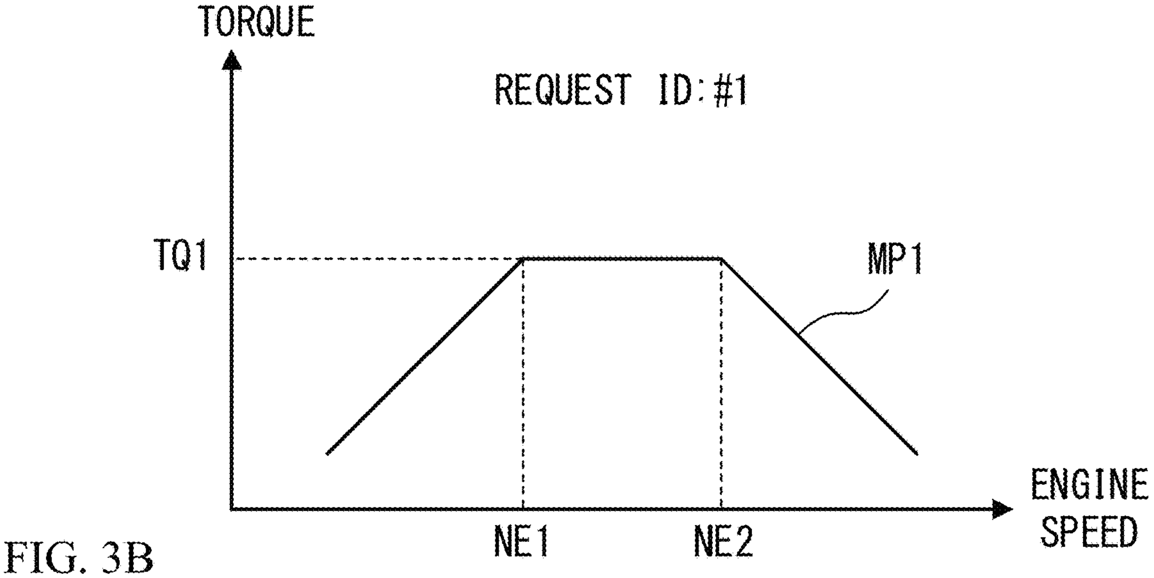
FIG. 3A is a view illustrating an example of a first torque upper limit map.

For example, as illustrated in FIG. 3A, a first torque map MP1 is stored in the ROM 15C as one of the plurality of torque maps. The first torque map MP1 is associated with the request ID "#1". In the first torque map MP1, the upper limit of the torque is defined by a constant torque "TQ1" from the engine speed "NE1" to the engine speed "NE2". When the engine speed is lower than the engine speed "NE1", the upper limit of the torque increases. When the engine speed is higher than the engine speed "NE2", the upper limit of the torque decreases. In this way, the first torque map MP1 is defined in a trapezoidal shape excluding a lower bottom.

Figure 3B:
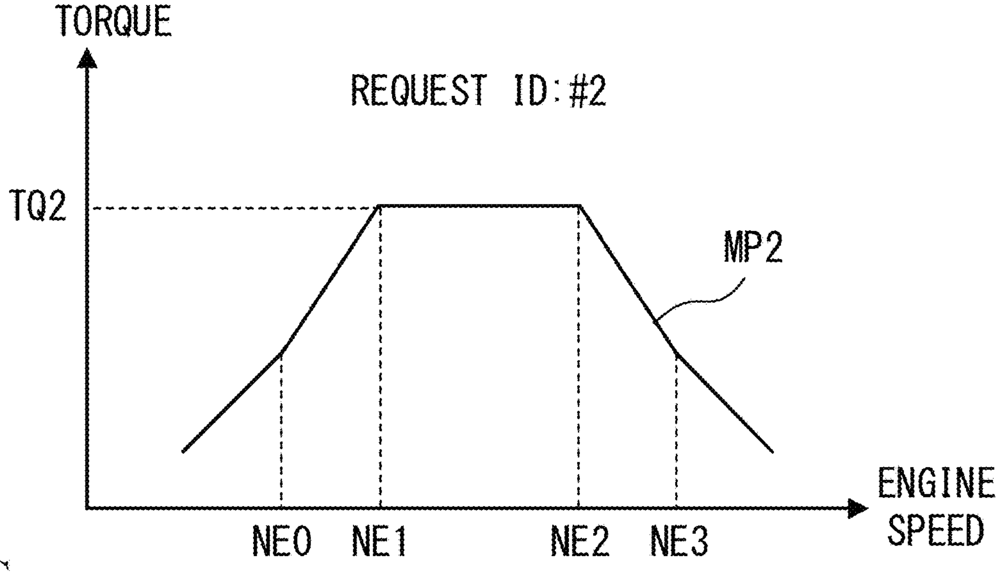
FIG. 3B is a view illustrating an example of a second torque upper limit map.

As illustrated in FIG. 3B, a second torque map MP2 is stored in the ROM 15C as one of the plurality of torque maps. The second torque map MP2 is associated with the request ID "#2". In the second torque map MP2, the upper limit of the torque is defined as a constant torque "TQ2" higher than the torque "TQ1", from the engine speed "NE1" to the engine speed "NE2".

In the second torque map MP2, when the engine speed is lower than the engine speed "NE1", the upper limit of the torque increases in a stepwise manner. Specifically, when the engine speed is lower than the engine speed "NE0", the upper limit of the torque increases at the same gradient as the first torque map MP1. On the other hand, the upper limit of the torque increases at a gradient steeper than the gradient of the first torque map MP1 from the engine speed "NE0" to the engine speed "NE1".

When the engine speed is higher than the engine speed "NE2", the upper limit of the torque decreases in a stepwise manner. Specifically, when the engine speed is higher than the engine speed "NE3", the upper limit of the torque decreases at the same gradient as the first torque map MP1. On the other hand, the upper limit of the torque decreases at a gradient steeper than the gradient of the first torque map MP1 from the engine speed "NE2" to the engine speed "NE3". Thus, the second torque map MP2 is defined in a shape different from that of the first torque map MP1.

Figure 3C:
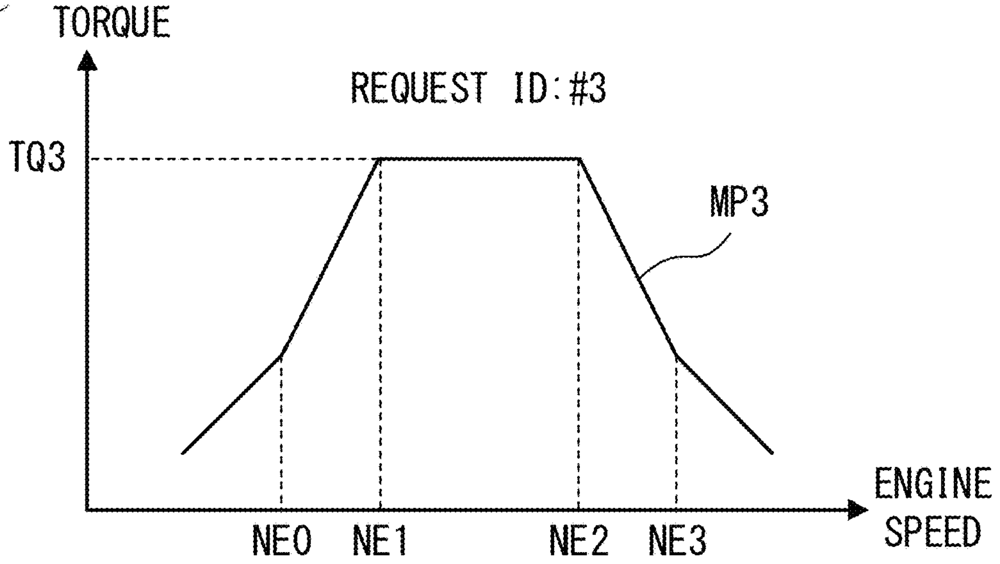
FIG. 3C is a view illustrating an example of a third torque upper limit map.

In addition, as illustrated in FIG. 3C, a third torque map MP3 is stored in the ROM 15C as one of the plurality of torque maps. The third torque map MP3 is associated with the request ID "#3". In the third torque map MP3, the upper limit of the torque is defined by a constant torque "TQ3" higher than the torque "TQ2" from the engine speed "NE1" to the engine speed "NE2".

In the third torque map MP3, the upper limit of the torque increases in a stepwise manner when the engine speed is lower than the engine speed "NE1". Specifically, when the engine speed is lower than the engine speed "NE0", the upper limit of the torque increases at the same gradient as the first torque map MP1. On the other hand, the upper limit of the torque increases at a gradient steeper than the gradient of the second torque map MP2 from the engine speed "NE0" to the engine speed "NE1".

When the engine speed is higher than the engine speed "NE2", the upper limit of the torque decreases in a stepwise manner. In concrete terms, when the engine speed is higher than the engine speed "NE3", the upper limit of the torque decreases at the same gradient as the first torque map MP1. On the other hand, the upper limit of the torque decreases at a gradient steeper than the gradient of the second torque map MP2 from the engine speed "NE2" to the engine speed "NE3". In this way, the third torque map MP3 is defined in a shape different from those of the first torque map MP1 and the second torque map MP2.

Figure 4:
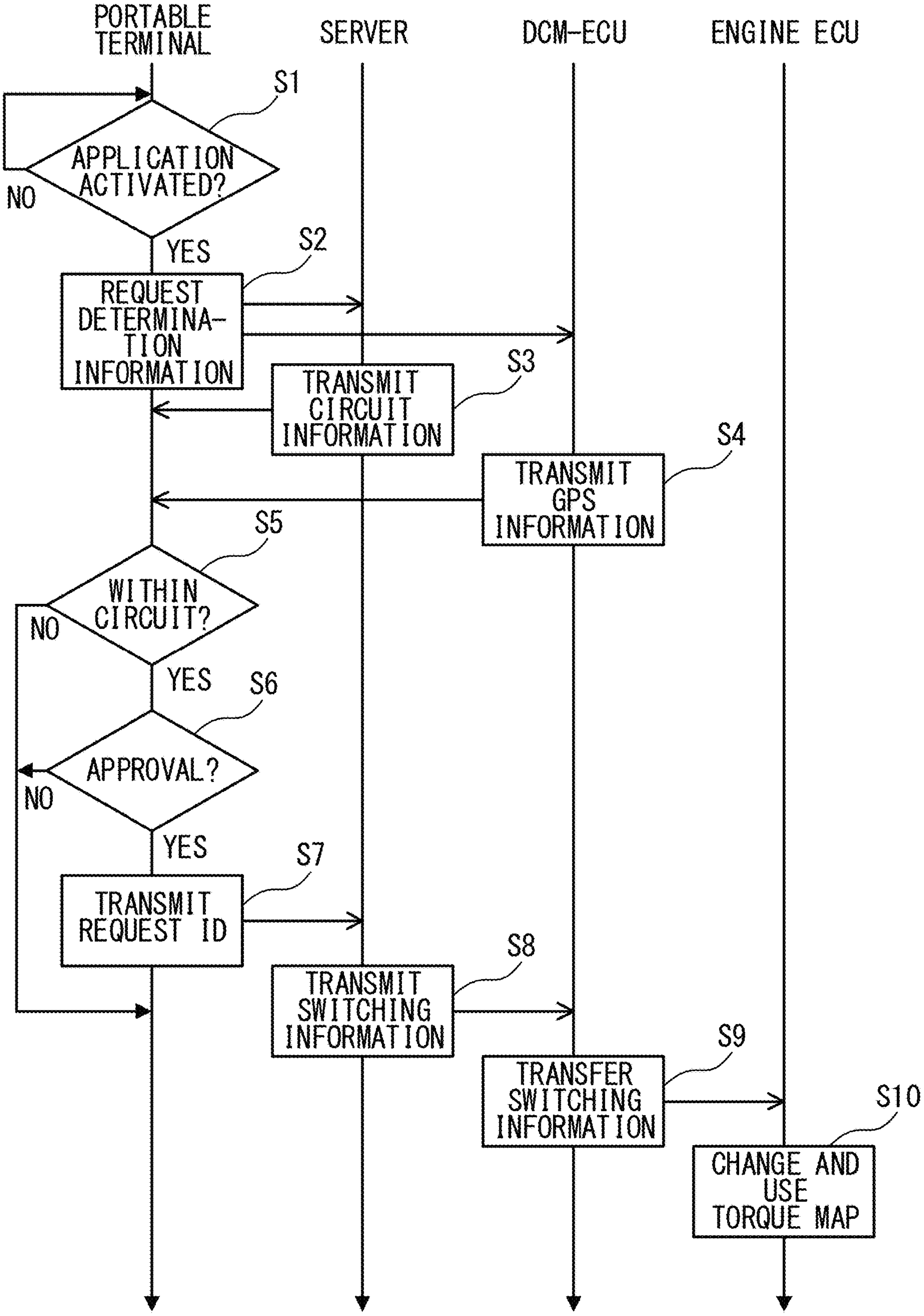
FIG. 4 is a processing sequence diagram illustrating an example of an operation of the vehicle control system.

Next, the operation of the vehicle control system ST will be described with reference to FIG. 4.

First, the portable terminal 30 waits until the circuit application is activated (step S1: NO). For example, the portable terminal 30 waits until the driver 10D performs a predetermined operation to instruct activation of the circuit application on an icon of the circuit application displayed on the portable terminal 30. When a predetermined operation is performed on the icon of the circuit application and the circuit application is activated (step S1: YES), the portable terminal 30 requests determination information from the server 20 and the DCM-ECU 12 (step S2). The determination information is information for determining whether or not the position of the vehicle 10 is within the circuit C1.

For example, the portable terminal 30 directly requests the server 20 to transmit the determination information. On the other hand, the portable terminal 30 indirectly requests the DCM-ECU 12 for the determination information. That is, the portable terminal 30 requests the DCM-ECU 12 for the determination information via the server 20. When the determination information is requested from the portable terminal 30, the server 20 transmits the circuit information as the determination information to the portable terminal 30 (step S3). When the determination information is requested from the portable terminal 30 via the server 20, the DCM-ECU 12 transmits the GPS information as the determination information to the portable terminal 30 via the server 20 (step S4).

When the portable terminal 30 acquires the GPS information and the circuit information, the portable terminal 30 determines whether or not the current position of the vehicle 10 is within the circuit C1 (step S5). If the current position is not within the circuit C1 (step S5: NO), the portable terminal 30 skips the subsequent process. In this case, the portable terminal 30 rejects the shift to the circuit mode, and thus the control of the vehicle 10 in the circuit mode is stopped.

On the other hand, if the current position is within the circuit C1 (step S5: YES), the portable terminal 30 determines whether or not there is an approval for the shift to the circuit mode (step S6). For example, the portable terminal 30 presents a notice of the shift to the circuit mode to the driver 10D on the screen of the portable terminal 30, and requests the driver 10D to accept the shift. The notes include, for example, an explanation about deterioration of the engine 14. When the driver 10D performs an operation to reject the shift to the circuit mode, the portable terminal 30 determines that the driver 10D does not accept the shift to the circuit mode (step S6: NO). In this case, the portable terminal 30 rejects the shift to the circuit mode, and thus the control of the vehicle 10 in the circuit mode is stopped.

On the other hand, when the driver 10D performs an operation of accepting the shift to the circuit mode (for example, pressing of an "OK" button as illustrated in FIG. 1), the portable terminal 30 determines that the driver 10D accepts the shift to the circuit mode (step S6: YES). In this case, the portable terminal 30 transmits the request ID to the server 20 (step S7). More specifically, the portable terminal 30 checks a version ID for identifying the version of the current circuit application installed in the portable terminal 30, and specifies and transmits the request ID corresponding to the version ID. For example, if the version of the circuit application identified by the version ID "Ver2" is installed in the portable terminal 30, the portable terminal 30 transmits the request ID "#2".

When the server 20 receives the request ID, the server 20 transmits the switching information to the DCM-ECU 12 (step S8). More specifically, when the server 20 receives the request ID, the server 20 generates the switching information including the received request ID and transmits the switching information to the DCM-ECU 12. When the DCM-ECU 12 receives the switching information, the DCM-ECU 12 transfers the switching information to the engine ECU 15 (step S9).

When the engine ECU 15 receives the switching information, the engine ECU 15 changes the torque map and immediately uses the changed torque map (step S10). More specifically, when the engine ECU 15 receives the switching information, the engine ECU 15 extracts the request ID from the switching information, and specifies and selects the torque map corresponding to the extracted request ID. For example, when the request ID "#2" is extracted, the engine ECU 15 specifies and selects the second torque map MP2 associated with the request ID "#2".

If the first torque map MP1 is used for the control of the vehicle 10 before the switching information is received, the engine ECU 15 changes the first torque map MP1 to the second torque map MP2 and uses the second torque map MP2 for the control of the vehicle 10. When the request ID "#3" is extracted in a state where the second torque map MP2 is used for the control of the vehicle 10, the engine ECU 15 changes the second torque map MP2 to the third torque map MP3 and uses the third torque map MP3.

As described above, according to the present embodiment, the engine ECU 15 includes the plurality of torque maps. Thus, the upper limit of the torque of the engine 14 is changed without updating software for controlling the vehicle 10 such as engine control software. The engine ECU 15 changes the torque map in conjunction with the version update each time the version of the circuit application is updated. Further, according to the present embodiment, the software is not updated, thereby avoiding the preprocess required for the software update. Therefore, the vehicle control system ST smoothly changes the torque map based on the update of the version of the circuit application.

Although some embodiments of the present disclosure have been described in detail, the present disclosure is not limited to the specific embodiments but may be varied or changed within the scope of the present disclosure as claimed.

What is claimed is:

1. A vehicle control system comprising:

a portable terminal in which application software associated with a vehicle equipped with an engine is installed; and an on-vehicle control device configured to store a plurality of torque upper limit maps each defining an upper limit of torque of the engine for each version of the application software, and to communicate with the portable terminal, wherein the on-vehicle control device is configured to change a first torque upper limit map among the plurality of torque upper limit maps to a second torque upper limit map among the plurality of torque upper limit maps, on a basis of an update of the version of the application software installed in the portable terminal, and to use the second torque upper limit map for controlling the vehicle, and wherein the on-vehicle control device is configured to change the first torque upper limit map to the second torque upper limit map every time the version is updated.

2. A vehicle control system comprising:

a portable terminal in which application software associated with a vehicle equipped with an engine is installed; and an on-vehicle control device configured to store a plurality of torque upper limit maps each defining an upper limit of torque of the engine for each version of the application software, and to communicate with the portable terminal, wherein the on-vehicle control device is configured to change a first torque upper limit map among the plurality of torque upper limit maps to a second torque upper limit map among the plurality of torque upper limit maps, on a basis of an update of the version of the application software installed in the portable terminal, and to use the second torque upper limit map for controlling the vehicle, and wherein the on-vehicle control device is configured to change the first torque upper limit map to the second torque upper limit map, when a shift to a circuit mode in which driving performance of the vehicle is improved in a circuit is requested from the portable terminal while the vehicle is stopped.

3. The vehicle control system according to claim 1, wherein the on-vehicle control device is configured to change the first torque upper limit map to the second torque upper limit map, when a shift to a circuit mode in which driving performance of the vehicle is improved in a circuit is requested from the portable terminal while the vehicle is stopped.

4. A vehicle comprising:

an engine;

a storage device configured to store a plurality of torque upper limit maps each defining an upper limit of torque of the engine for each version of application software installed in a portable terminal and associated with a vehicle equipped with the engine; and a control device configured to communicate with the portable terminal, to change a first torque upper limit map among the plurality of torque upper limit maps to a second torque upper limit map among the plurality of torque upper limit maps on a basis of an update of the version of the application software installed in the portable terminal, and to use the second torque upper limit map for controlling the vehicle, wherein the control device is configured to change the first torque upper limit map to the second torque upper limit map every time the version is updated.

* * * * *